(12) United States Patent
Lin

(10) Patent No.: US 6,238,553 B1
(45) Date of Patent: May 29, 2001

(54) BUOYANT WATER CHLORINATOR WITH TEMPERATURE, PH MEASUREMENT AND CHLORINE CONCENTRATION DISPLAYS

(76) Inventor: Fong-Jei Lin, 19450 Via Madronas Ct., Saratoga, CA (US) 95070

( * ) Notice: Subject to any disclaimer, the term of this patent is extended or adjusted under 35 U.S.C. 154(b) by 0 days.

(21) Appl. No.: 09/442,655

(22) Filed: Nov. 18, 1999

(51) Int. Cl.⁷ ..................................... B01D 17/12

(52) U.S. Cl. .............. 210/94; 210/85; 210/169; 210/198.1; 210/242.1; 73/53.01; 204/412; 324/425; 422/265

(58) Field of Search ............... 210/85, 94, 96.1, 210/169, 241, 242.1, 742, 743, 149, 198.1, 754; 324/429, 438, 441, 425; 422/265; 73/53.01, 61.41; 204/400, 407, 412

(56) References Cited

U.S. PATENT DOCUMENTS

| | | | |
|---|---|---|---|
| 4,657,670 | * | 4/1987 | Newton .................................. 210/85 |
| 4,940,946 | * | 7/1990 | Nazaryan .............................. 324/438 |
| 5,053,205 | * | 10/1991 | Taylor et al. ....................... 210/198.1 |
| 5,218,304 | * | 6/1993 | Kinlen et al. ........................ 324/438 |
| 5,493,164 | * | 2/1996 | Moss et al. .......................... 204/412 |

* cited by examiner

*Primary Examiner*—Joseph W. Drodge

(57) ABSTRACT

A buoyant water conditioner has a housing with an upper surface and an apertured chamber for receiving a chlorination agent. Three separate measurement systems are carried by the housing: a water temperature system, a pH level system, and a chlorine concentration system. Each system has a sensor for measuring the respective water parameter, a display for displaying the measured value, and a processor for converting the sensor signals to display driving signals. Each system is powered by a solar cell battery or a chemical battery.

5 Claims, 2 Drawing Sheets

BUOYANT WATER CHLORINATOR WITH TEMPERATURE, PH MEASUREMENT AND CHLORINE CONCENTRATION DISPLAYS

BACKGROUND OF THE INVENTION

This invention relates generally to water chlorination units. More particularly, this invention relates to a buoyant water chlorination unit with improved user features.

Water chlorination units are known which are used to supply chlorine to water in pools for water purification. Several such units are buoyant with an inner chamber providing a containment volume for the chlorination material, typically one or more solid pellets, with the containment volume having openings through the walls thereof so that the chlorination material can dissolve in the surrounding water.

Known water chlorination units are used in conjunction with a thermometer, and a pH level and chlorine concentration testing kit in many applications. The thermometer is used to measure the temperature of the water, typically in a swimming pool or Jacuzzi spa, and typically consists of a floating glass tube thermometer with a graduated temperature scale printed or embossed on a panel in a position adjacent the thermometer tube, and a tether cord fastened at one end to the thermometer panel and fastened at the other end to an anchor point. To read the thermometer, the thermometer is retrieved from the water by grasping and pulling the tether cord. The testing kit is used to determine the pH of the water and the chlorine concentration. The kit typically includes a housing with a panel provided with two multi-color reference charts: one indicating pH and the other indicating chlorine concentration, usually in parts-per-million (ppm). Also, the kit includes a pH testing container and a chlorine testing container, with both containers typically permanently affixed to the housing. Two testing solutions are usually provided, one for the pH measurement, and the other for the chlorine concentration measurement. In use, a water sample is placed in each of the two testing containers, and a quantity of each testing solution is placed in the respective container. The color of the solution is then visually compared with the two color charts, and the user subjectively determines the pH and chlorine concentration values. Additional chlorine is then added to the pool water, if the measurement process indicates the need to do so.

While used widely, the thermometer and testing kits described above have several disadvantages. First, there are three separate and distinct parts to the known arrangement, any one of which may be easily misplaced, lost or broken. In addition, the thermometer floats with the motion of the pool water and is not usually conveniently located next to the buoyant chlorinator unit. Moreover, the testing kit must be stored somewhere on the pool premises and brought to the pool site each time it is required for use. Further, the pH and chlorine concentration solutions must be kept in separate storage containers, which can also be easily misplaced, and must be individually handled by the user. Last, the technique for both the pH and the chlorine concentration measurements is entirely subjective, and prone to error.

SUMMARY OF THE INVENTION

The invention comprises a buoyant chlorinator which incorporates the temperature, pH and chlorine concentration measurement functions, and which is devoid of all the disadvantages of known prior art arrangements as noted above.

The invention comprises a buoyant housing with a lower apertured chamber for holding chlorine material, such as solid tablets, as in conventional devices. A removable cover retains the chlorine material in place. A plurality of measurement systems, each microprocessor-based, is carried by the housing. Each system has an easily-readable display, preferably mounted on the periphery of an upper housing surface, each display preferably comprising a liquid crystal display (LCD). One measurement system comprises a temperature sensor, such as a thermistor, for measuring the temperature of the ambient water. Electrical temperature signals produced by this sensor are coupled to a microprocessor programmed to convert these signals to signals capable of driving the associated display. A second measurement system comprises a pH level sensor for measuring the pH level of the ambient water. Electrical signals produced by this sensor are coupled to a microprocessor programmed to convert these signals to signals capable of driving the associated display. The remaining measurement system comprises a chlorine concentration sensor for measuring the chlorine concentration of the ambient water. Electrical signals produced by this sensor are coupled to a microprocessor programmed to convert these signals to signals capable of driving the associated display.

Electrical power is supplied to each measurement system from a power source contained within the housing. One suitable power source is a solar cell battery mounted on the same surface as the displays. Another source is a battery installed in a battery compartment. Both types of power source may be included and either source may serve as the primary power source for all systems, with the remaining source reserved as a back-up source, or the two sources may both serve as primary sources for different systems.

The invention is used by placing it in the body of water and observing the display values. When chlorine material must be replaced, the cover is removed, and the fresh material is dropped into the receptacle chamber.

For a fuller understanding of the nature and advantages of the invention, reference should be made to the ensuing detailed description taken in conjunction with the accompanying drawings.

DETAILED DESCRIPTION OF THE PREFERRED EMBODIMENTS

Figure 1:
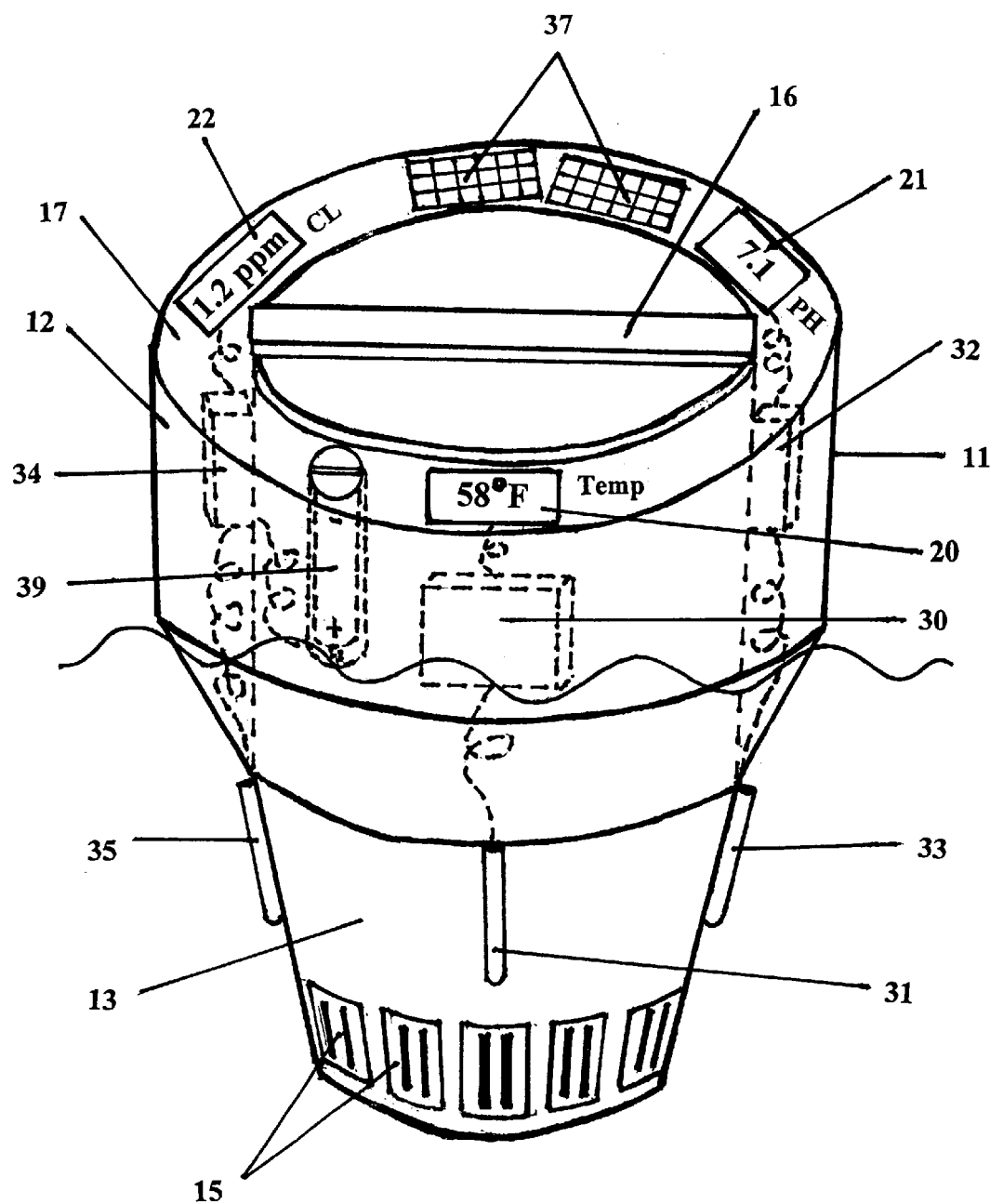
FIG. 1 is a schematic view of the preferred embodiment of the invention.

Turning now to the drawings, FIG. 1 is a schematic view illustrating the preferred embodiment of the invention. As seen in this Fig., the preferred embodiment includes a housing 11, typically made from plastic material. Housing 11 has an upper sealed hollow space 12 to ensure buoyancy in water, and a lower wall portion 13 providing a hollow interior for receiving one or more water-soluble chlorine tablets (not shown). A plurality of adjustable openings 15 are distributed about the circumference of lower wall portion 13 to allow water to enter the hollow interior volume and leach chlorine from the tablets. A cover 16 is removably mounted to the top of housing 11. To add more chlorine tablets, cover 16 is removed to expose the hollow lower interior.

Arranged about the upper peripheral surface 17 of housing 11 are three liquid crystal (LCD) displays 20–22. Display 20 is a water temperature display and is electrically coupled to a microprocessor-based temperature processing unit 30 shown in FIG. 2, which receives water temperature measurement signals from a temperature sensor 31. Display 21 is a pH level display and is electrically coupled to a microprocessor-based pH level processing unit 32, which receives pH level signals from a pH electrode 33. Display 22 is a chlorine concentration display and is electrically coupled to a microprocessor-based chlorine concentration processing unit 34, which receives signals from a chlorine concentration detector 35.

Electrical power is supplied to the displays 20–22, sensors 31, 33, and 35, and processing units 30, 32, and 34 by one or more solar cells 37 mounted on the upper peripheral surface 17 of housing 11. An alternate source consisting of a battery 39 mounted in an appropriate portion of housing 11 is also provided.

Figure 2:
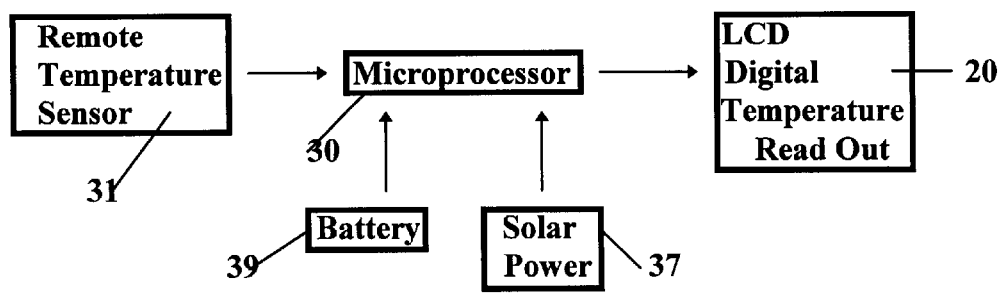
FIG. 2 is a block diagram of the temperature measurement system incorporated into the preferred embodiment of the invention.

FIG. 2 is a block diagram of the water temperature measurement system described above. As seen in this FIG. remote temperature sensor 31, which may comprise any one of a number of commercially available devices capable of generating signals representative of the temperature with which the unit 31 comes in contact (such as a thermistor), has an output electrically coupled to the microprocessor unit 30. Microprocessor unit 30 may comprise any known microprocessor capable of receiving the signals from sensor 31 and converting these signals to signals capable of operating display 20. The display output of microprocessor unit 30 is electrically coupled to the display input terminals of display 20, which displays temperature value in the form of integers plus an indication of the scale employed (i.e., Fahrenheit, Celsius, or some other scale).

Figure 3:
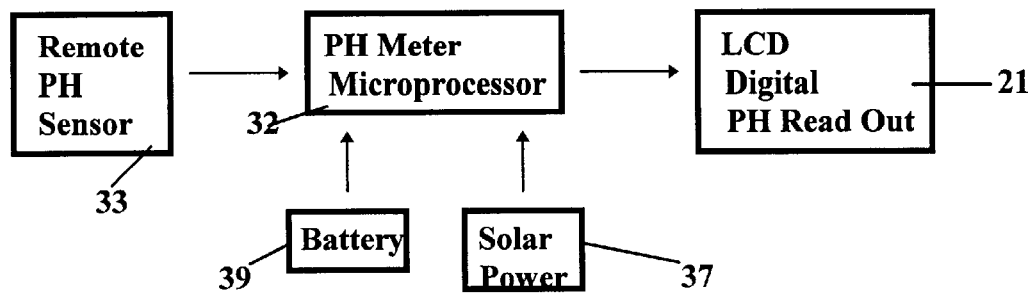
FIG. 3 is a block diagram of the pH measurement system incorporated into the preferred embodiment of the invention.

FIG. 3 is a block diagram of the pH measurement system described above. As seen in this FIG. remote pH electrode 33 has a signal output electrically coupled to the microprocessor unit 32. Electrode 33 may comprise any one of a number of commercially available sensors capable of generating electrical signals representative of the pH level of water with which the electrode 33 comes in contact ( such as the sensor component incorporated into the series H-58800 pH meters available from ATI-Orion Research, Inc.). Microprocessor unit 32 may comprise the same type of unit as microprocessor unit 30, with different programming to convert the pH input signals to signals capable of operating display 21. The display output of microprocessor 32 is electrically coupled to the display input terminals of display 21, which displays pH values in the normal form of an integer, a decimal point and another integer.

Figure 4:
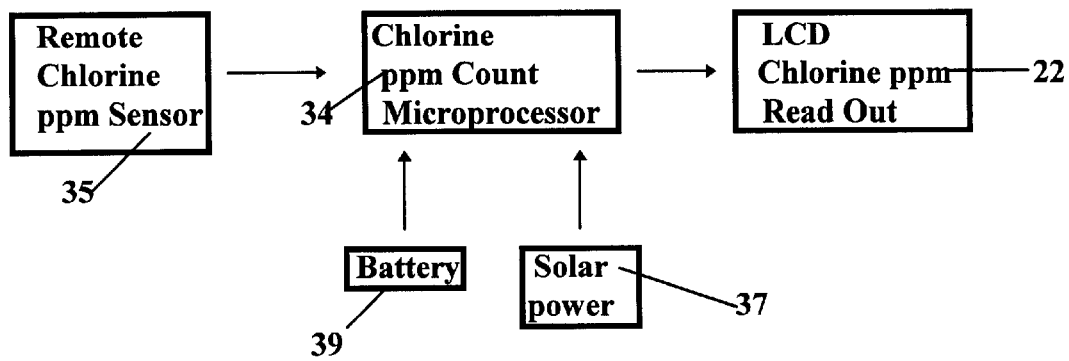
FIG. 4 is a block diagram of the chlorine concentration measurement system incorporated into the preferred embodiment of the invention.

FIG. 4 is a block diagram of the chlorine concentration system described above. As seen in this FIG. chlorine sensor 35 has a signal output electrically coupled to microprocessor 34. Sensor 35 may comprise any one of a number of known sensors capable of generating signals representative of the chlorine concentration (usually in ppm) of water with which sensor 35 comes in contact. Microprocessor unit 34 may comprise the same type of unit as microprocessor unit 30, with different programming to convert the chlorine concentration signals supplied by sensor 35 to signals capable of operating display 22. The display output of microprocessor unit 34 is coupled to the input terminals of display 22, which displays chlorine concentration in the form of one or more integers and the legend "ppm".

As illustrated in FIGS. 2–4, each unit is electrically powered by either solar cells 37, battery 39, or a combination of the two. More specifically, if one or two of the systems shown in FIGS. 2–4 draws substantially more power than the others, either the solar cells 37 or the battery 39 may be dedicated to the unit(s) with a higher power consumption, with the remaining power source shared among all three systems. In the alternative, one of the two power sources (e.g., solar cells 37) may serve as the principal power source for all three units, and the other source used as a back-up source.

As will now be apparent, the invention provides all of the common pool water functions formerly found in separate devices—i.e., temperature measurement, pH measurement and chlorine concentration- in one integral unit. Consequently, the user need only deal with a single unit in order to determine water temperature, pH level and chlorine concentration. Moreover, the user can quickly and conveniently check each value by simply reading the appropriate display. In addition, the use of the electronic pH level and chlorine concentration systems eliminates the subjective nature of each measurement in prior art arrangements and does away with the formerly required test solutions. As a result, pool water maintenance is simplified and made more precise through use of the invention.

Although the above provides a full and complete disclosure of the preferred embodiments of the invention, various modifications, alternate constructions and equivalents will occur to those skilled in the art. For example, although the invention has been described with reference to LCD displays 20–22, other types of displays which are easily readable in the water environment (such as bright sunlight) may be employed. In addition, displays 20–22 may be mounted on the housing in other locations than the upper peripheral surface. Further, although the invention has been described with reference to separate microprocessors for each measurement system, a single microprocessor with mutliplexed input ports may be employed, as desired. Also, the invention may be configured with less than all of the three systems, if deemed useful or desirable. Therefore, the above should not be construed as limiting the invention, which is defined by the appended claims.

What is claimed is:

1. A buoyant water conditioner comprising:
   a buoyant housing having an upper surface with a peripheral portion and an apertured chamber for receiving a chlorination agent;
   a plurality of measurement systems carried by said housing:
   a first one of said measurement systems including a pH sensor for generating signals representative of water pH level, a pH level display for displaying the value of the water pH, and a processor coupled to said pH sensor and said pH level display for converting the pH sensor signals to pH level display driving signals;
   a second one of said measurement systems including a chlorine concentration sensor for generating signals representative of the water chlorine concentration, a chlorine concentration display for displaying the value of the water chlorine concentration, and a processor coupled to said chlorine concentration sensor and said chlorine concentration display for converting the chlorine concentration sensor signals to chlorine concentration display driving signals;
   a third one of said measurement systems including a water temperature sensor for generating signals representative of water temperature, a water temperature display and a processor coupled to said water temperature sensor and said water temperature display for converting the water temperature sensor signals to water temperature display driving signals; and a source of electrical power for providing power to said systems each said display being mounted on said peripheral portion of said upper surface of said housing so as to be viewable from the top of said housing when said buoyant water conditioner is suspended in a body of water.

2. The invention of claim 1 wherein each said display comprises a liquid crystal display.

3. The invention of claim 1 wherein said source of electrical power comprises a solar cell battery.

4. The invention of claim 1 wherein said source of electrical power comprises a chemical battery.

5. The invention of claim 1 wherein said source of electrical power is mounted on said upper surface of said housing.

* * * * *